(12) United States Patent  
Groening

(10) Patent No.: US 7,741,746 B2  
(45) Date of Patent: Jun. 22, 2010

(54) MAGNETIC TORQUE LIMITER

(75) Inventor: Ingolf Groening, Lohr am Main (DE)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 11/957,705

(22) Filed: Dec. 17, 2007

(65) Prior Publication Data

US 2008/0150383 A1 Jun. 26, 2008

(30) Foreign Application Priority Data

Dec. 20, 2006 (DE) .................. 10 2006 060 986

(51) Int. Cl.  
*H02K 49/00* (2006.01)

(52) U.S. Cl. ............... 310/106; 310/78; 310/92

(58) Field of Classification Search ........ 310/75 R, 310/103, 105, 112, 114, 78, 92–96, 101, 310/106; 192/84.1–84.6  
See application file for complete search history.

(56) References Cited

U.S. PATENT DOCUMENTS

| 4,115,040 A * | 9/1978 | Knorr ............... 417/420 |
| 5,779,456 A * | 7/1998 | Bowes et al. ......... 417/420 |
| 5,856,719 A * | 1/1999 | De Armas ............ 310/103 |
| 6,841,909 B2 * | 1/2005 | Six ................... 310/103 |
| 6,841,910 B2 * | 1/2005 | Gery .................. 310/103 |

FOREIGN PATENT DOCUMENTS

| DE | 1850245 | 4/1962 |
| DE | 26 59 585 | 7/1977 |
| GB | 1 532 510 | 11/1978 |

* cited by examiner

*Primary Examiner*—Tran N Nguyen  
(74) *Attorney, Agent, or Firm*—Michael J. Striker

(57) ABSTRACT

A magnetic slip clutch has an outer rotor and an inner rotor, one of the rotors includes permanent magnets, and one of the rotors includes slots, and both rotors are located coaxially to one another; the outer rotor is embodied as a hollow cylinder open on one end, which cylinder includes a face-end covering with a central recess, by which the hollow cylinder can be located on a shaft, and the inner rotor is embodied as a solid cylinder, which is located inside the outer rotor, and a shaft can be located in a central recess in the solid cylinder, and a separate shaft is connectable to each rotor, so that the axis of rotation of the two separate shafts is identical, and a torque transmission is possible from one shaft to the other shaft by both rotors.

21 Claims, 5 Drawing Sheets

MAGNETIC TORQUE LIMITER

CROSS-REFERENCE TO A RELATED APPLICATION

The invention described and claimed hereinbelow is also described in German Patent Application DE 10 2006 060986.7 filed on Dec. 20, 2006. This German Patent Application, whose subject matter is incorporated here by reference, provides the basis for a claim of priority of invention under 35 U.S.C. 119(a)-(d).

BACKGROUND OF THE INVENTION

The invention relates to a magnetic torque limiter and its use in conjunction with a motor or generator.

To limit the torque of a motor shaft or generator shaft, mechanical slip clutches are known, as also described in German Utility Model DE 1850245 U. Such a slip clutch has the disadvantage that because of its mechanical embodiment it is subject to severe wear. Magnetic slip clutches are also known. German Published Patent Disclosure DE 26 59 585, for instance, shows a magnetic slip clutch particularly for driving a centrifuge. The housing of the clutch is embodied as a rotor and is connected to the motor by means of an additional rubber coupling and by means of a number of drive bolts.

The disadvantage of this arrangement is that simple, flexible inclusion of the device in various drive concepts is not readily possible. Moreover, this version operates on the principle of an asynchronous machine; that is, the clutch, because of the currents that occur in the aluminum-filled slots, converts power into power loss, and slip fundamentally occurs between the two clutch rotors.

SUMMARY OF THE INVENTION

The object of the invention is to construct a slip clutch in which the two rotors function as synchronously as possible and there is as little power loss as possible.

This object is attained by the invention by means of the use of a magnetic slip clutch with an outer rotor and an inner rotor; one of the rotors includes a plurality of permanent magnets, and the other rotor includes a plurality of protrusions, and both rotors are located coaxially to one another and spaced apart from one another by an air gap, and the number of protrusions of a magnetically conductive rotor is equal to the number of permanent magnets of the other rotor, and the protrusions and permanent magnets are distributed uniformly over the circumference, in particular essentially in the axial direction.

The concept of "an arrangement of the protrusions in the axial direction" need not necessarily be understood to mean a completely parallel orientation of the axis of rotation. To optimize the running properties, the magnets and/or protrusions may also be located on the surfaces in tilted fashion, relative to the axis of rotation.

The embodiment according to the invention operates on the principle of a reluctance machine, except that instead of windings for generating a rotary field, a rotor equipped with permanent magnets and driven by a drive mechanism is used. When the reluctance principle is employed, the first rotor that carries the protrusions preferably comprises a toothed soft-iron core. The clutch action comes about because the closest tooth of the first rotor is attracted by the permanent magnets of the second rotor, since in this way the magnetic resistance decreases.

Slip in normal operation is avoided, and only negligible power loss occurs, as long as the allowable maximum torque is not exceeded. The power fed into the clutch is thus also output by the clutch again. The term "normal operation" is understood in terms of the invention to mean the rpm range at which the clutch operates in the engaged state. Outside normal operation, the maximum allowable torque has been exceeded, and the clutch no longer transmits the input power in a ratio of 1:1. In the engaged state and without torque, the teeth and magnets are located directly opposite one another.

On being loaded with a torque, the drive side leads ahead of the driven side, until the torque is transmitted. The torque increases, in a first approximation, sinusoidally up to the maximum torque (response torque of the clutch). The maximum torque depends on the design of the clutch, or in other words on the geometric dimensions of the clutch components, the air gap radius, the temperature, the remanence induction of the magnets, and so forth. As soon as a relative rotation takes place between the two rotors (or between the drive side and driven side of the clutch), the rotors assume a position in which the air gap between protrusions and magnets becomes minimal. In this state, the term used is an engaged clutch; that is, both rotors are rotating at identical rpm with minimal slip.

Since the arrangement strives always to put Itself in the position of the least energy content (maximum inductance), it revolves synchronously with the magnetic field as long as the maximum allowable torque is not exceeded. Not until the maximum allowable torque is exceeded does the relative position of the rotors to one another change.

Preferably, the width, viewed in cross section, of the protrusions corresponds essentially to from 0.9 to 1.1 times the width, viewed in cross section, of the permanent magnets, and the width of the permanent magnets and of the protrusions is preferably identical. The dimensioning of the geometry of the arrangement is always dependent on the power to be transmitted and on the maximum torque required. This reduces or avoids saturation effects and thus reduces losses.

Preferably, the protrusion surfaces are embodied as convex or concave in cross section, and the permanent magnet surfaces oriented toward the protrusion surfaces are embodied as complementary to the protrusion surface and are thus concave or convex in cross section, creating a substantially uniform air gap between the two surfaces, which brings about the development of a substantially homogeneous magnetic field.

Preferably, a permanent magnet, viewed in cross section, extends over a region of $(k*360°)/(2p)$ along the rotor surface, and the constant k is preferably in the range between 0.2 and 0.7, and especially preferably in the range between 0.2 and 0.44 or between 0.45 and 0.55, and p represents the number of pole pairs, one pole pair being formed by means of two permanent magnets of different polarity. Given a number of pole pairs of p=200, magnets are thus obtained having a center angle, observed in cross section, of 0.18 to 0.63°.

The optimal number of pole pairs is always dependent on the required power or the required maximum allowable torque and on the installation space available. By means of the relationships shown here, the aspects and peripheral conditions that occur in practical use in dimensioning a device of the invention are readily taken into account, with a balanced cost-benefit ratio.

Preferably, the outer rotor is embodied as a hollow cylinder open on one end, which includes a face-end covering with a central recess, by means of which the hollow cylinder can be located on a shaft, and the inner rotor is embodied as a solid cylinder which is located inside the outer rotor; a shaft can be located in a central recess of the solid cylinder, and a separate shaft can be connected to each rotor, so that the axis of rotation of the two separate shafts is identical, and torque transmission from one shaft to the other shaft is possible by means of both rotors.

The number of components is thus minimized. Only two cylindrical rotors and optionally two shafts are required. Alternatively, an existing motor shaft or generator shaft can be connected directly to one of the rotors, so that instead of two shafts, now only one shaft is needed for putting the clutch into operation. Even this one shaft could also be dispensed with, if the existing shaft of a device to be driven or a driving device is used, so that the number of components is reduced to the two rotors. Easy, flexible adaptation to the most various rotating devices is thus made possible.

Preferably, permanent magnets are distributed uniformly over the circumference on the inner wall of the hollow cylinder, and axial longitudinal slots are distributed, corresponding to the permanent magnets, over the circumference of the solid cylinder, and the protrusions and magnets present between the recesses are diametrically opposite one another. Because of the disposition of the magnets on the inner wall, the mechanical connection between the magnets and inner wall is not exposed to any centrifugal forces, so that high rotary speeds are attainable. The rotary speed is definitively dependent on the diameter and on the structural length of the clutch. Theoretically, rotary speeds of over 50,000 rpm are conceivable.

Alternatively, longitudinal slots are distributed uniformly over the circumference on the inner wall of the hollow cylinder, and corresponding to the longitudinal slots, permanent magnets are distributed uniformly over the circumference of the solid cylinder.

Especially preferably, the dimensions of the permanent magnets and of the longitudinal protrusions present between the longitudinal slots are dimensioned in accordance with a torque threshold value, and if the torque threshold value is exceeded the rpm of one rotor decreases compared to the rpm of the other rotor.

Advantageously, one shaft is located on each rotor; it protrudes from at least one end of the rotor, and on the opposite end of the rotor, it comes to an end essentially flush with the rotor.

The embodiment according to the invention thus axially decouples devices located on the shafts and limits the maximum torque that can be transmitted. Since the torque limitation is based solely on magnetic action, this embodiment functions maximally free of wear, because there is no mechanical contact whatever between the rotors.

Also advantageously, the rotors are surrounded by a housing; the rotors rotate relative to this housing, and the shafts are rotatably supported on the housing. The housing can therefore be fixedly mounted on a device and protects the magnetic slip clutch.

Preferably, a rotary synchronous motor with magnetic torque limitation, implemented by means of a slip clutch according to the invention; the motor shaft is connected directly, in a manner fixed against relative rotation, to one of the shafts of the slip clutch, or the motor shaft represents at least one shaft of the slip clutch, and the other shaft functions as a power takeoff means, to which a device to be driven by the motor is connectable. The slip clutch can thus easily be integrated into a motor housing and can easily be retroactively connected to an existing motor. The compact construction requires little space. This is true even if the rotary synchronous motor is surrounded by a housing which includes the motor and the slip clutch.

The same advantages are attained for a generator with magnetic torque limitation, embodied as a slip clutch according to the invention. The generator shaft is connected directly, in a manner fixed against relative rotation, to one of the shafts of the slip clutch, or the generator shaft represents at least one shaft of the slip clutch, while the other shaft functions as a generator drive, to which a device that in turn drives the generator can be connected. Once again, the generator is advantageously surrounded by a housing inside which all the components are located.

In a power plant or a wind farm with a generator and a slip clutch according to the invention, the mechanisms (gears, windmill vanes) are effectively protected against excessive torques, for instance even in the case of a short circuit in the electronics. Even the network that is supplied by the generator can be protected against sudden load peaks (caused for instance by gusts of wind).

In a drive system with a drive controller and a drive regulator, which includes a rotary synchronous motor with magnetic torque limitation according to the invention, an overload on the drive can be precluded in a simple mechanical way without requiring additional electronics for the purpose.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
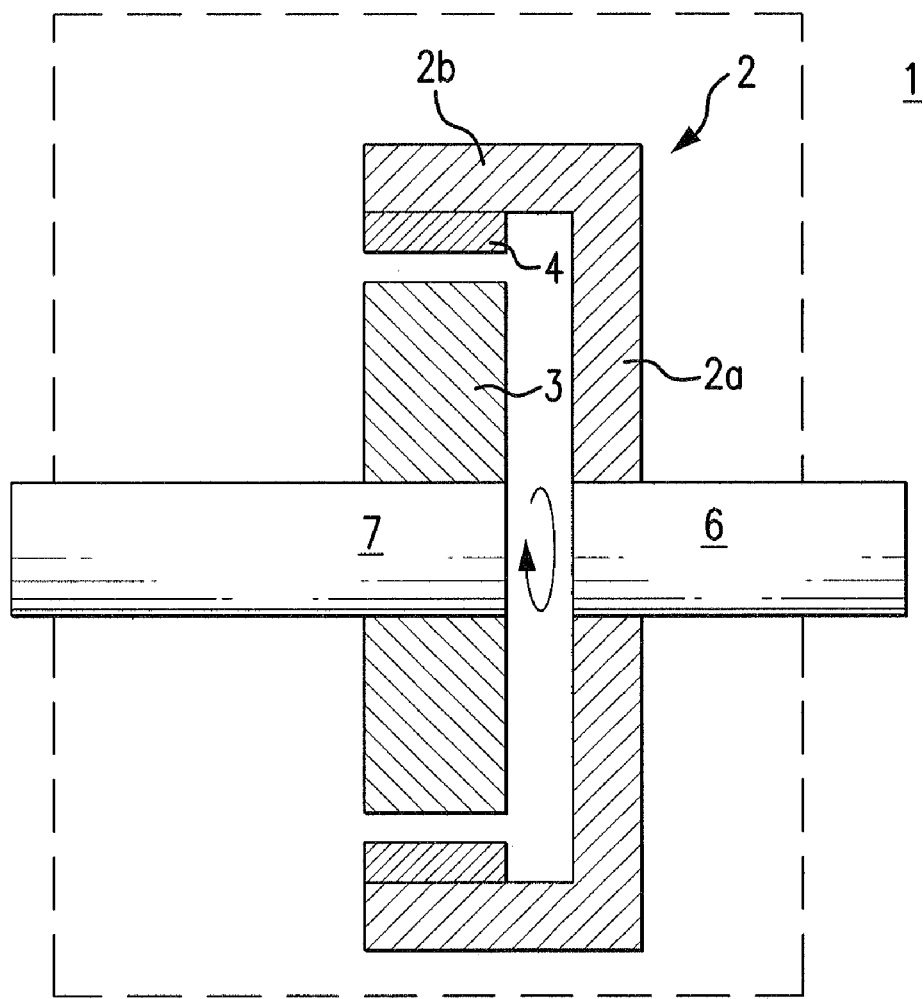
FIG. 1 is a view showing a slip clutch in accordance with the invention in longitudinal section.

A magnetic slip clutch of the invention includes a so-called bell 2, which functions as an outer rotor 2 and in bell-like fashion surrounds the inner rotor 3; one of the rotors 2 includes permanent magnets 4, and the other rotor 3 includes slots 5, and the two rotors 2, 3 are located coaxially to one another. The bell 2 is embodied as a hollow cylinder 2b, open on one end, which includes a face-end covering 2a with a central recess, by means of which covering and recess the bell 2 is located on a shaft 6, and the inner rotor 3 is embodied as a solid cylinder 3, which is located inside the bell 2, and a shaft 7 is located in a central recess in the solid cylinder 3. This makes it possible for the axis of rotation of both separate shafts 6, 7 to be identical and makes a torque transmission possible from one shaft 6, 7 to the other shaft 6, 7 at the same rpm.

In the embodiment shown here, permanent magnets 4 are distributed uniformly over the circumference on the inner wall of the bell 2b, and axial longitudinal slots 5 are distributed uniformly over the circumference of the solid cylinder 3, in a manner corresponding to the permanent magnets 4. One shaft 6 is located on each rotor 2, 3. It protrudes from at least one end of the rotor and on the opposite end of the rotor it comes to an end essentially flush with the rotor.

In FIG. 1, for instance, one shaft (on the right in the drawing) protrudes from the bell 2 and comes to an end flush on the inside of the bell 2. The inner rotor 3 is located opposite this flush ending. A shaft 7 is located on the inner rotor 3 as well and comes to an end flush with the rotor 3 on the rotor end toward the bell 2, while on the opposite end of the rotor 3 (on the left in the drawing), the shaft 7 protrudes. Preferably, both rotors 2, 3 are surrounded by a housing (not shown); the rotors 2, 3 rotate relative to this housing, and the shafts 6, 7 are preferably rotatably supported on the housing.

On one end of the shafts 6, 7 of the slip clutch, the shaft of a motor or generator could be located. However, it would also be possible for the shaft of a motor or generator to be located directly inside the recesses in the rotors 2, 3. In this configuration, the slip clutch 1 could be integrated with a motor housing or generator housing, or it would be possible for the slip clutch 1 to be flanged separately to an existing motor housing or generator housing.

Figure 2:
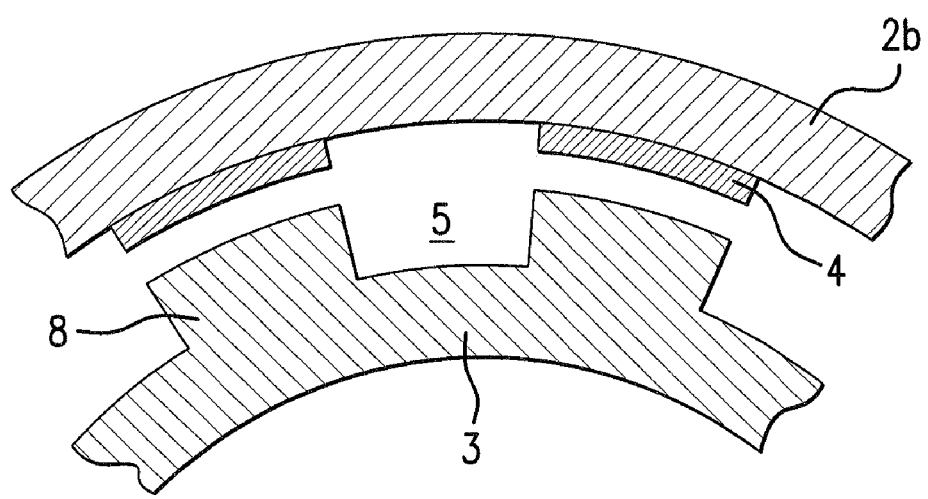
FIG. 2 is a view showing a sequential cross-section of the inventive slip clutch.

FIG. 2 shows a segmental cross section of the slip clutch. A cross section of the bell wall 2b is shown, on the inside of which permanent magnets 4 are distributed uniformly on the circumference. Located coaxially to this is the inner rotor star 3, with protrusions 8 and recesses 5 distributed uniformly on the circumference correspondingly to the magnets 4. The rotor star 3 and bell 2 are supported movably relative to one another. Accordingly, the slip clutch 1 of the invention fundamentally comprises a segment 3 of a circle with teeth 8 and a ring 2b with magnets 4.

The shape of the magnets 4 is optimized in such a way that if a defined torque is exceeded, the clutch 1 slips. As soon as the torque is again below the defined torque, the ring 2b catches on the next protrusion 8, and the clutch engages, so that once again the full power is transmitted.

Figure 3:
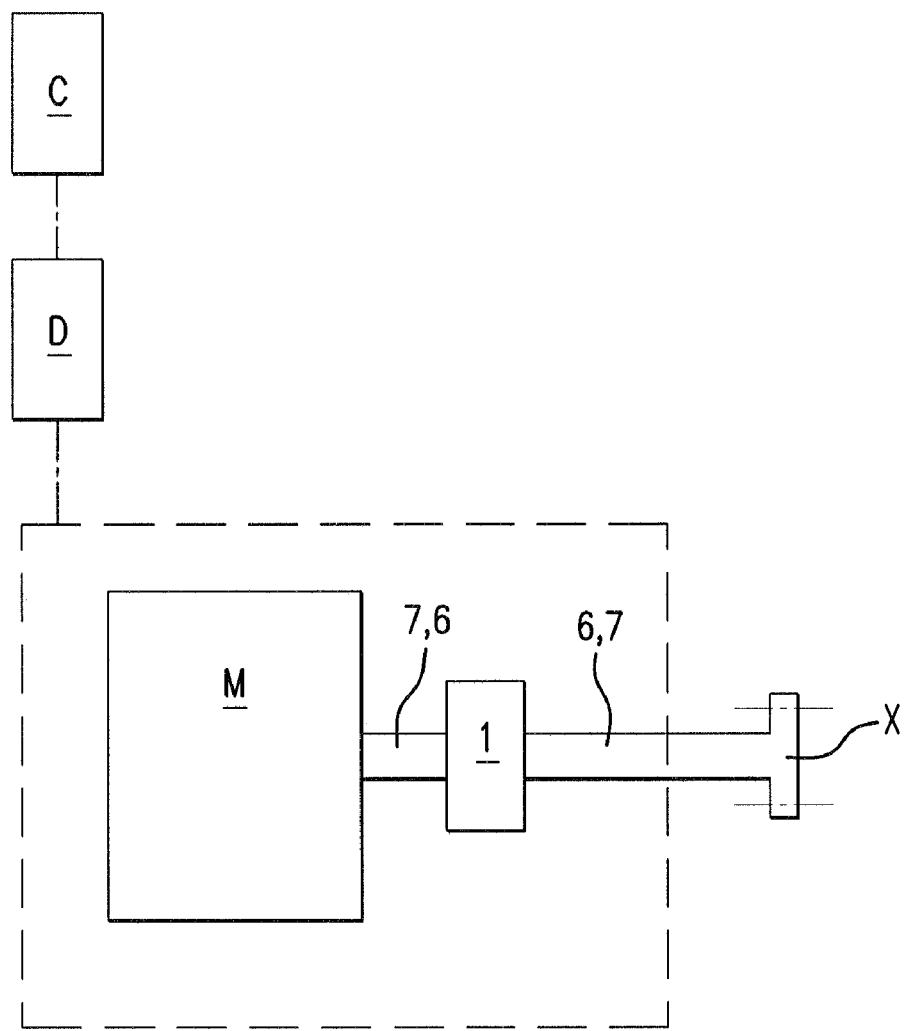
FIG. 3 is a view of a drive system in accordance with the invention.

FIG. 3 shows a drive system having a drive controller C, a drive regulator D, a rotary synchronous motor M, and a torque limitation comprising a magnetic slip clutch 1, shafts 6, 7 and means to ensure that the motor is connectable X to a device to be driven.

Figure 4:
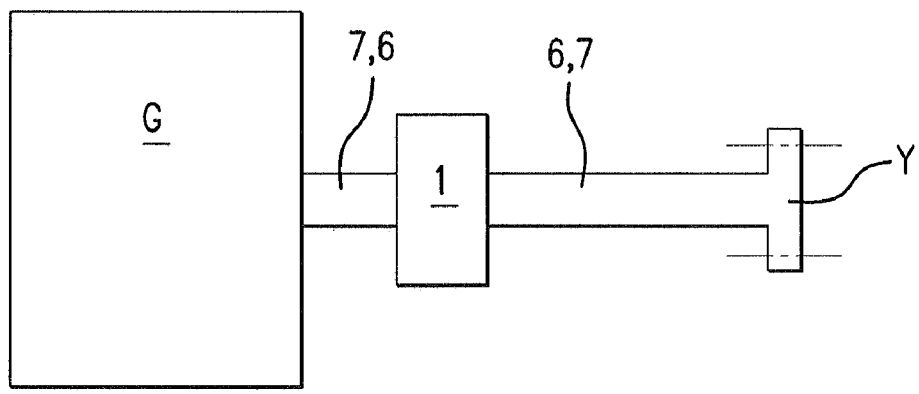
FIG. 4 is a view of a generator with a magnetic torque limitation in accordance with the invention.

FIG. 4 shows a generator G with a magnetic torque limitation, comprising a generator shaft 6, 7 and magnetic slip clutch 1, and means to ensure that the generator is connectable Z to a device that drives the generator G.

Figure 5:
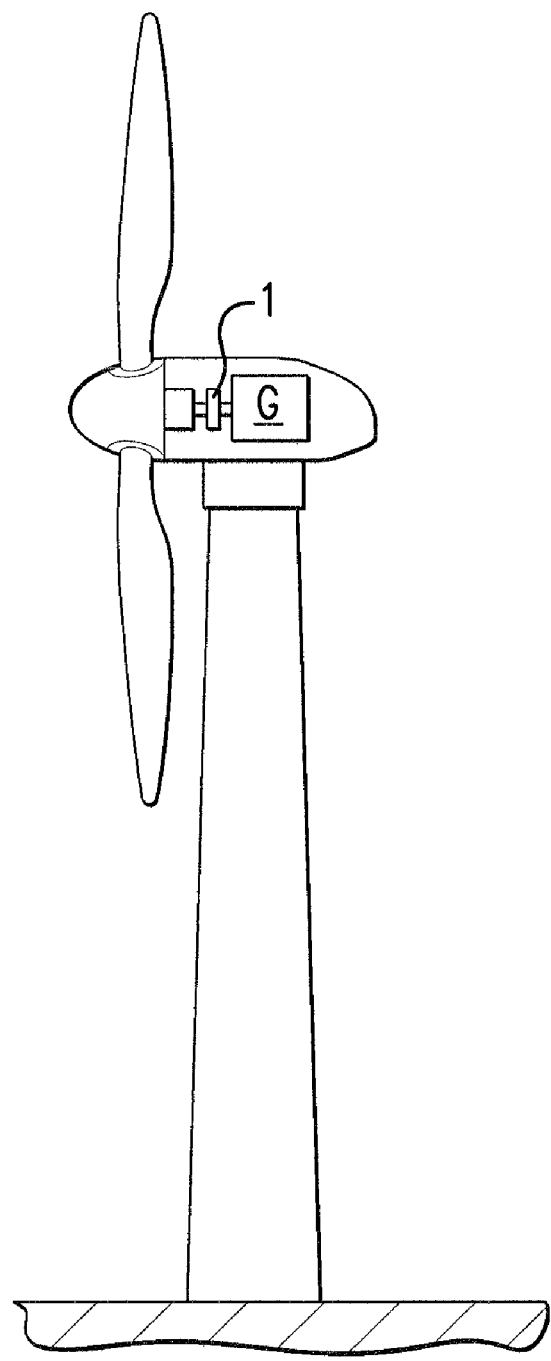
FIG. 5 is a view of a wind farm including a generator having a magnetic torque limitation clutch including a slip clutch.

FIG. 5 shows a wind farm comprising a generator G with a magnetic torque limitation including a slip clutch 1.

The invention can be used for all kinds of energy generation, and at the same time the generator and the mechanisms to be driven, especially in wind farms, water power plants and tidal power plants, are protected against excessive rotary speeds.

The invention furthermore ensures the safe transmission of a torque and the safe transmission of power, up to a maximum allowable torque or a maximum allowable power level. The function is attained without active actuation (for instance, windings supplied with current), since the arrangement contains only iron and the material for permanent magnets. The arrangement therefore functions maximally without loss.

It will be understood that each of the elements described above, or two or more together, may also find a useful application in other types of constructions differing from the type described above.

While the invention has been illustrated and described as embodied in a magnetic torque limiter, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A magnetic slip clutch for electrical machines, comprising:
   an outer rotor including a plurality of permanent magnets;
   an inner rotor, wherein said inner rotor is formed as a solid cylinder having axial longitudinal slots distributed over a circumference of the solid cylinder, in a manner corresponding to positioning of said permanent magnets, both said rotors being located coaxially to one another and spaced apart from one another by an air gap;
   shafts selected from the group consisting of drive shafts and driven shafts and connected to said two rotors, and wherein the principle of a reluctance machine is utilized.

2. A magnetic slip clutch as defined in claim 1, wherein said protrusions have a width, viewed in a cross-section, which corresponds substantially to from 0.9 to 1.1 times a width, viewed in a cross-section, of said permanent magnets.

3. A magnetic slip clutch as defined in claim 2, wherein the width of said permanent magnets and the width of said protrusions are identical.

4. A magnetic slip clutch as defined in claim 1, wherein a protrusions surface is selected from the group consisting of a convex surface and a concave surface in a cross-section, and permanent magnet surfaces oriented toward the protrusion surfaces are configured corresponding to said protrusion surface so that a substantially uniform air gap is formed between said surfaces of said protrusions and said permanent magnets.

5. A magnetic slip clutch as defined in claim 1, wherein each of said permanent magnets, viewed in a cross-section, extends over a region of $(k*360°)/(2p)$ along a rotor surface, wherein p represents a number of pole pairs, with one of the pole pairs being formed by two of said permanent magnets of different polarity.

6. A magnetic slip clutch as defined in claim 5, wherein a constant k is in a range between 0.2 and 0.7.

7. A magnetic slip clutch as defined in claim 5, wherein a constant k is in a range between 0.2 and 0.44.

8. A magnetic slip clutch as defined in claim 5, wherein a constant k is in a range between 0.45 and 0.55.

9. A magnetic slip clutch as defined in claim 1, wherein said outer rotor is configured as a first cylindrical body which includes a face-end covering with a central recess, and said inner rotor is configured as a second cylindrical body which is located inside said outer rotor, and one separate shaft of said shafts is connectable to each of said rotors so that an axis of rotation of both said separate shafts is identical, and a torque transmission between said both separate shafts is provided.

10. A magnetic slip clutch as defined in claim 9, wherein said permanent magnets are distributed uniformly over a circumference of an inner wall of said first body, and axial longitudinal slots are distributed over a circumference of said second body in a way corresponding to said permanent magnets.

11. A magnetic slip clutch as defined in claim 9, wherein longitudinal slots are distributed uniformly over a circumference of an inner wall of said first body, and said permanent magnets are distributed over a circumference of said second body in a way corresponding to said longitudinal slots.

12. A magnetic slip clutch as defined in claim 1, wherein said permanent magnets and said protrusions provided between longitudinal slots have dimensions which are dimensioned in accordance with a torque threshold value, so that if the torque threshold value is exceeded an rpm of one of said rotors decreases compared to an rpm of the other of said rotors.

13. A magnetic slip clutch as defined in claim 1, wherein said one of said shafts is located on each of said rotors and protrudes from at least one end of said rotor and on an opposite end of said rotor comes to an end essentially flush with said rotor.

14. A magnetic slip clutch as defined in claim 1; and further comprising a housing, said rotors being rotatable relative to said housing, and said shafts being rotatably supported on said housing.

15. A rotary synchronous motor with a magnetic torque limitation, comprising:
 a motor shaft;
 a magnetic slip clutch; and
 a slip clutch including an outer rotor having a plurality of permanent magnets; an inner rotor, wherein said inner rotor is formed as a solid cylinder having axial longitudinal slots distributed over a circumference of the solid cylinder, in a manner corresponding to positioning of said permanent magnets, both said rotors being located coaxially to one another and spaced apart from one another by an air gap;
 shafts selected from the group consisting of drive shafts and driven shafts and connected to said two rotors, said motor shaft being connected directly in a manner fixed against relative rotation, to one of said shafts of said slip clutch, or said motor shaft is formed by one of said shafts of said slip clutch, while another of said shafts of said slip clutch is configured as a power takeoff means, to which a device to be driven by the motor is connectable, and wherein the principle of a reluctance machine is utilized.

16. A rotary synchronous motor as defined in claim 15; and further comprising a housing that accommodates said motor shaft and said slip clutch.

17. A generator with a magnetic torque limitation, comprising:
 a generator shaft; and
 a magnetic slip clutch including an outer rotor having a plurality of permanent magnets; an inner rotor, wherein said inner rotor is formed as a solid cylinder having axial longitudinal slots distributed over a circumference of the solid cylinder, in a manner corresponding to positioning of said permanent magnets, both said rotors being located coaxially to one another and spaced apart from one another by an air gap;
 shafts selected from the group consisting of drive shafts and driven shafts and connected to said two rotors, said generator shaft being connected directly in a manner fixed against relative rotation, to one of said shafts of said slip clutch or said generator shaft is configured as one of said shafts of said slip clutch, while another shaft of said slip clutch is configured as a drive mechanism, to which a device that drives said generator is connectable, and wherein the principle of a reluctance machine is utilized.

18. A generator as defined in claim 17; and further comprising a housing accommodating said generator shaft and said slip clutch.

19. A power plant, comprising a generator as defined in claim 17.

20. A wind farm comprising a generator as defined in claim 17.

21. A drive system, comprising a drive controller; a drive regulator; and a rotary synchronous motor with a magnetic torque limitation as defined in claim 15.

* * * * *